United States Patent [19]
Miyauchi et al.

[11] Patent Number: 4,833,573
[45] Date of Patent: May 23, 1989

[54] HEADLIGHT FOR VEHICLE

[75] Inventors: Shizuya Miyauchi; Kiyoshi Wada, both of Shimizu, Japan

[73] Assignee: Koito Seisakusho Co., Ltd., Tokyo, Japan

[21] Appl. No.: 137,021

[22] Filed: Dec. 22, 1987

[30] Foreign Application Priority Data

Dec. 22, 1986 [JP] Japan .................... 61-305834

[51] Int. Cl.$^4$ .................... B60Q 1/10; B60Q 11/00; B62J 6/00
[52] U.S. Cl. .................... 362/71; 362/72
[58] Field of Search .................... 362/71, 72

[56] References Cited

U.S. PATENT DOCUMENTS

| | | | |
|---|---|---|---|
| 3,646,339 | 2/1972 | Yssel | 362/71 |
| 3,939,339 | 2/1976 | Alphen | 362/72 |
| 4,024,387 | 5/1977 | Alphen | 362/72 |
| 4,075,469 | 2/1978 | Alphen | 362/72 |

Primary Examiner—Allen M. Ostrager
Attorney, Agent, or Firm—Sughrue, Mion, Zinn, Macpeak & Seas

[57] ABSTRACT

A headlight for use in a vehicle and of the type including a light source and a lens which are rotatable around the optical axis of the light source and the lens to define the inclination of the distribution of the light beam in the transverse directions. The light source and the lens are formed unitally and are supported in a lamp body rotatably around the optical axis, and the lamp body is provided with a driving device for rotating the integrally formed light source and the lens.

9 Claims, 12 Drawing Sheets

HEADLIGHT FOR VEHICLE

The present invention will be described according to following items.
A. Field of the Invention
B. Prior Art
   a. General Background [FIG. 13~FIG. 15]
   b. Prior Art Headlight
C. Problems to be solved by the Invention
D. Summary of the Invention
E. Brief Description of Drawings
F. Embodiment
   a. Headlight [FIG. 1~FIG. 7]
      a-1 Lamp Body [FIG. 1~FIG. 3]
      a-2 Reflecting Mirror, Cover Lens [FIG. 1~FIG. 3]
      a-3 Movable Portion [FIG. 1, FIG. 2, FIG. 4~FIG. 7]
         a-3a Connecting Member [FIG. 1, FIG. 4, FIG. 5]
         a-3b Control Lens [FIG. 1, FIG. 4]
         a-3c Bulb [FIG. 1, FIG. 2, FIG. 4~FIG. 6]
         a-3d Support by Lamp Body [FIG. 1]
         a-3e Light Distribution [FIG. 5, FIG. 7]
      a-4 Driving Means of Movable Portion [FIG. 1, FIG. 4]
      a-5 Driving Means of Lamp Body [FIG. 2, FIG. 3]
   b. Inclination Detector of Vehicle [FIG. 8~FIG. 11]
      b-1 Casing [FIG. 9~FIG. 11]
      b-2 Gimbals [FIG. 8~FIG. 11]
      b-3 Motor, Rotating Member [FIG. 8~FIG. 11]
      b-4 Potentiometer [FIG. 8~FIG. 12]
      b-5 Operation
   c. Control Circuit [FIG. 12]
   d. Light Distribution Adjusting Operation
G. Advantages of the Invention

FIELD OF THE INVENTION

The present invention relates to a headlight for use in a vehicle such as a motor cycle and, particularly to a headlight of the type which enables to adjust the light distribution in the transverse direction by changing simultaneously the direction of a plurality of optical members, and aims to provide novel and improved means for changing the direction of the plurality of optical members, thereby reducing the size and weight of the headlight and improving the operational characteristics of the headlight.

PRIOR ART a. General Background [FIG. 13-FIG. 15]

A lighting member should have a predetermined light distribution as required by the illuminating function of the lighting member, such that a headlight of a vehicle is required to have a light distribution a of so-called low beam as shown in FIG. 13. In the drawing, shown at b, and b are shoulders of a road, c is the center line, d is a traveling lane and e is a facing lane. Further, V—V is the vertical line relative to the traveling lane, and H—H is the horizontal line.

While, a two wheeled vehicle such as a motor cycle inclines the vehicle body in the transverse direction in traveling a curved lane or in changing the track for managing the centrifugal force, thus, the headlight also inclines in the same direction and the distribution of the light inclines accordingly.

Namely, when the two wheeled vehicle travels along a leftward curved road, the driver inclines the vehicle body leftward by an angle a as shown in two dotted chain lines in FIG. 14 and the light distribution of the headlight also inclines leftward as shown in full line f in FIG. 15. When the two wheeled vehicle travels along a rightward curved road, the driver inclines the body of the vehicle rightward by an angle $\beta$ as shown in chain lines in FIG. 14 and the light distribution of the headlight also inclines rightward as shown in chain line g in FIG. 15.

When the light distribution inclines leftward as shown in line f, the headlight illuminates too near portion on the traveling lane and a portion higher than the horizontal line H—H on the facing lane which is hazardous against the facing vehicles. When the light distribution inclines rightward the headlight also illuminates too near portion on the traveling lane.

b. Prior Art Headlight

It has been proposed to adjust the light distribution by detecting the inclination of the body of the two wheeled vehicle and changing the direction of members determining the inclination of the light distribution. Japanese Patent Publication No. 56-18430 shows one example, wherein a reflective mirror supporting a bulb and a lens is rotatable around the optical axis and, when the body of the vehicle inclines in the transverse direction the mirror is rotated by an electric motor to adjust the light distribution.

PROBLEMS TO BE SOLVED BY THE INVENTION

The prior art headlight described as above has been formed to move integrally the reflecting mirror, the lens and the electric bulb, thus, the movable portion is increased in the size and the weight, and it is required to use a complicated supporting structure such that the reflective mirror is supported by a plurality of rollers on the casing of the light.

Thus, the dimension and the weight of the headlight device increase, and the driving force also increases. Further, it is required to increase the driving force of the movable portion, and it is difficult to accurately adjust the movement of the movable portion.

SUMMARY OF THE INVENTION

According to the invention, there is provided a headlight for use in a vehicle of the type wherein the inclination of the light distribution in the transverse direction is defined by the rotation of the light source and the lens around the optical axis, characterized in that the light source and the lens are formed integrally and are supported in a lamp body rotatable around the optical axis, and that a driving means is provided in the lamp body to rotate the integrally formed light source and the lens.

Thus, according to the invention, it is required to move only the light source and the lens in adjusting the light distribution and the construction of supporting means for the movable members can be simplified, and the dimension and the weight of the headlight can be reduced to the minimum, further, the adjusting movement is smooth and accurate.

BRIEF DESCRIPTION OF THE DRAWINGS

FIG. 1 through FIG. 7 show one example of a headlight of a vehicle according to the present invention, and FIG. 1 is a vertical sectional view taken along line I—I in FIG. 2:

FIG. 2 is a plan view;

FIG. 3 is a side view;

FIG. 4 is a perspective view of a movable portion;

FIG. 5 is a partial enlarged rear view;

FIG. 7 is a view showing the light distribution;

FIG. 8 through FIG. 11 shows an inclination detector of a vehicle body, wherein FIG. 8 shows the working principle; FIG. 9 is a vertical sectional view; FIG. 10 is a sectional view taken along line X—X in FIG. 9; and FIG. 11 is a partially broken perspective view;

EMBODIMENT

One embodiment according to the invention will now be explained in conjunction with the drawings.

It will be noted that the embodiment enables to adjust the light distribution in the transverse directions, and also in the vertical directions.

a. Headlight [FIG. 1~FIG. 7]

Figure 1:
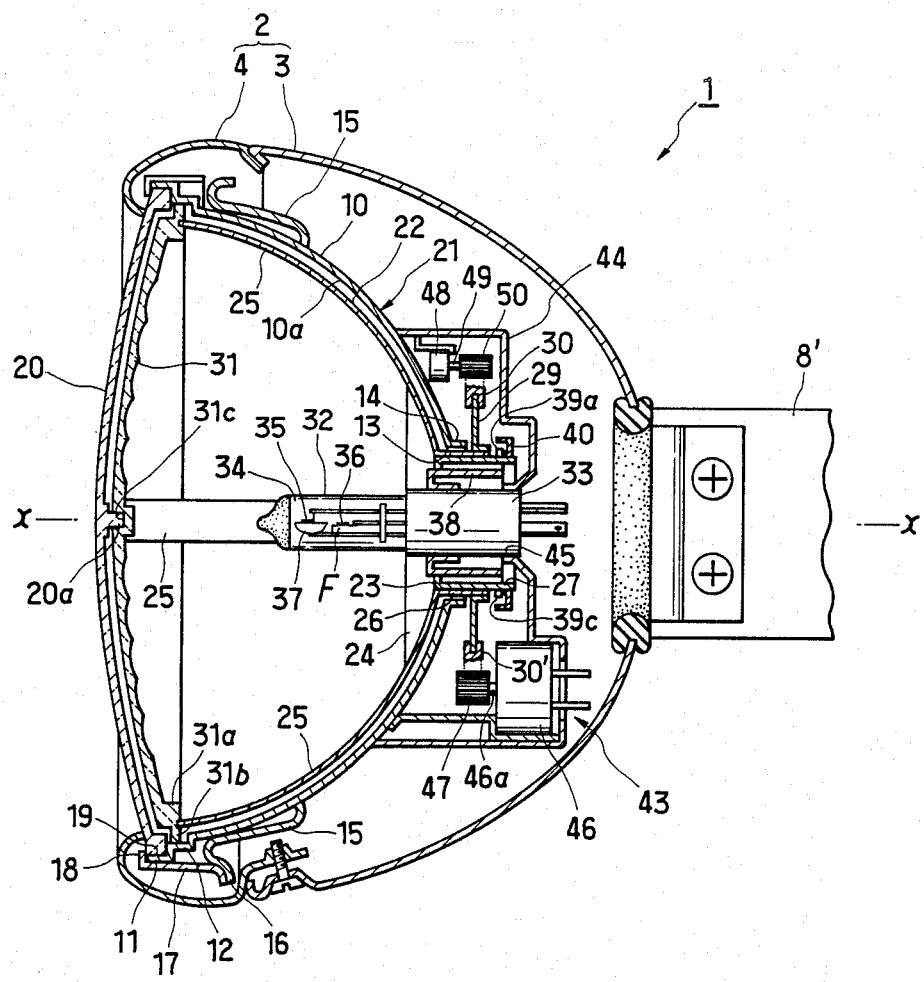
Figure 2:
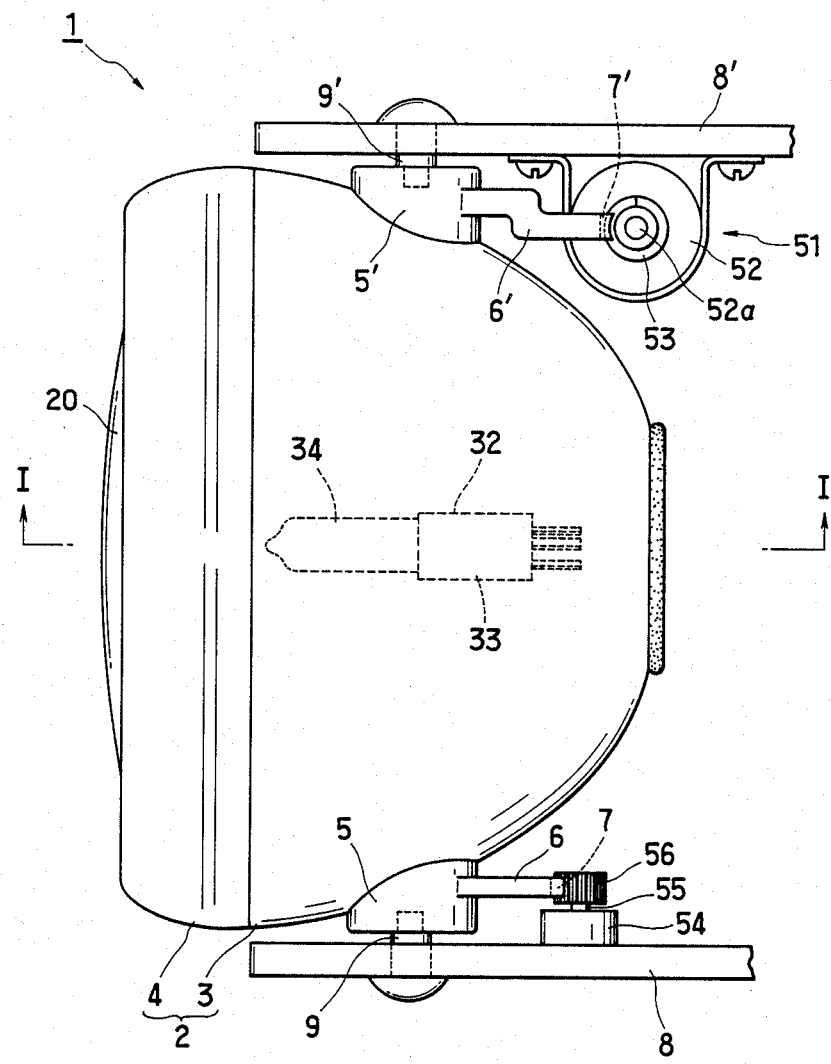
Figure 3:
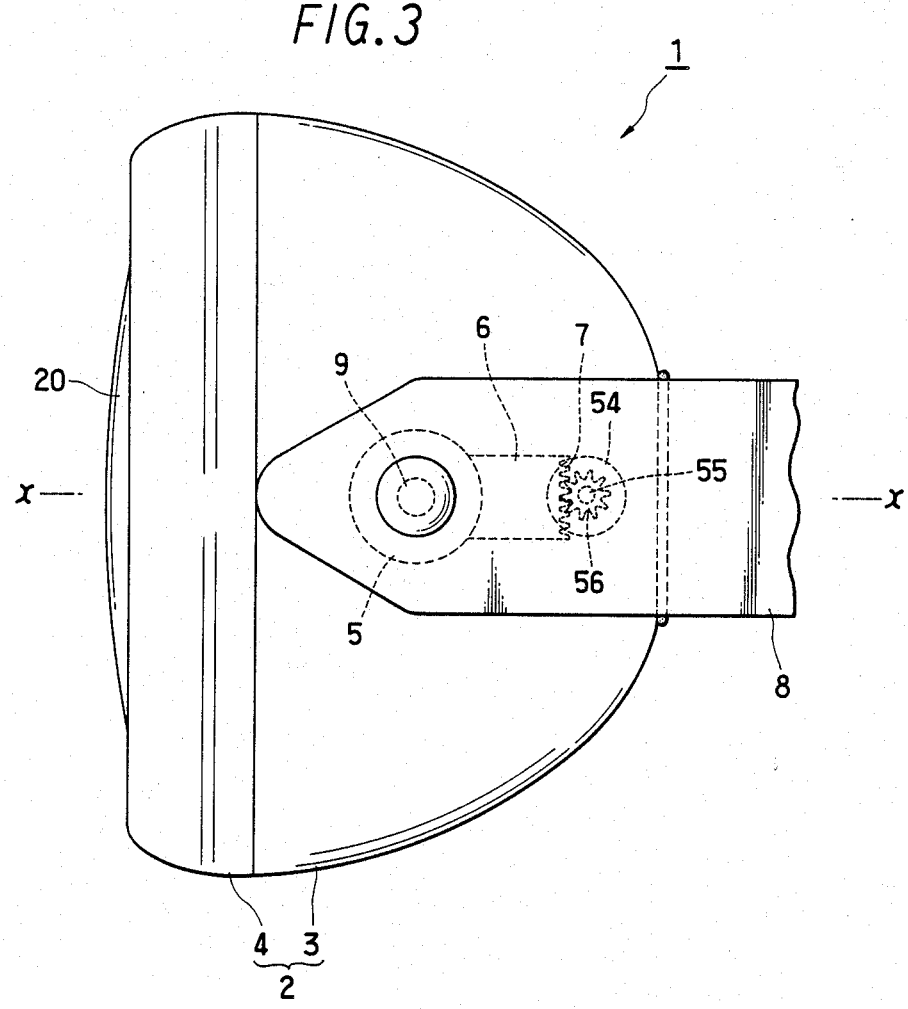

Shown at 1 in the drawings is a headlight according to the invention. In FIG. 2, the left side is the front side of the vehicle, the right side the rear side, the upper side the right side and, the lower side is the left side.

a-1 Lamp Body [FIG. 1~FIG. 3]

The headlight 1 includes a lamp body 2, which includes a generally bowl shaped main portion 3 with an open end thereof located forward, and a generally annular rim 4 connected to the open end of the main body 3. There are provided on left and right side of the main portion 3 projecting portions 5 and 5' having generally circular configuration as viewed from transverse directions and having rearward and generally horizontally extending arms 6 and 6' respectively. The arms 6 and 6' have on the rear ends generally vertically extending worm gears 7 and 7' which cooperate respectively with worm wheels which will be explained afterwards.

Supporting arms 8 and 8' extend forwards from the front end of the body of a vehicle (not shown) and are spaced left and right directions from each other. The supporting arms 8 and 8' have on the front end portions thereof supporting shafts or pins 9 and 9' to project opposingly to each other for rotatably supporting the projecting portions 5 and 5' respectively, thereby the lamp body 2 can be inclined generally vertically with respective to the vehicle body.

a-2 Reflecting Mirror, Cover Lens [FIG. 1~FIG. 3]

Shown at 10 is a reflecting mirror having a reflecting surface 10a of the shape of a paraboloid of revolution, and generally annular lens supporting portions 11 and 12 are formed on the front end portion of the mirror 10 by bending and expanding the portion in two steps as shown in FIG. 1. An annular opening 13 is formed in the rear end portion of the mirror 10, and annular projection 14 is formed on the edge of the opening 13 to project rearward from the mirror 10.

A generally annular mounting ring 15 is secured to the outer surface of the mirror 10, and a plurality of connecting pieces 16, 16 . . . (only one of which is shown in FIG. 1) are formed on the front edge of the ring 15.

There is provided a generally annular retaining ring 17 having on the front edge thereof a generally annular lens retaining portion 18 which is formed by bending radially inward the front edge portion. The retaining ring 17 is connected to the mirror 10.

An annular groove 19 (FIG. 1) is formed by the lens supporting portion 11 of the front side and the lens retaining portion 18 of the retaining ring 17 to receive therein the outer circumference of a cover lens 20.

The connecting pieces 16, 16 . . . of the mounting ring 15 are connected to the rear end portion of the retaining ring 17, thereby the cover lens 20 is fitted to close the open end of the rim 4 or to close the open end of the lamp body 2.

a-3 Movable Portion [FIG. 1, FIG. 2, FIG. 4~FIG. 7]

Figure 4:
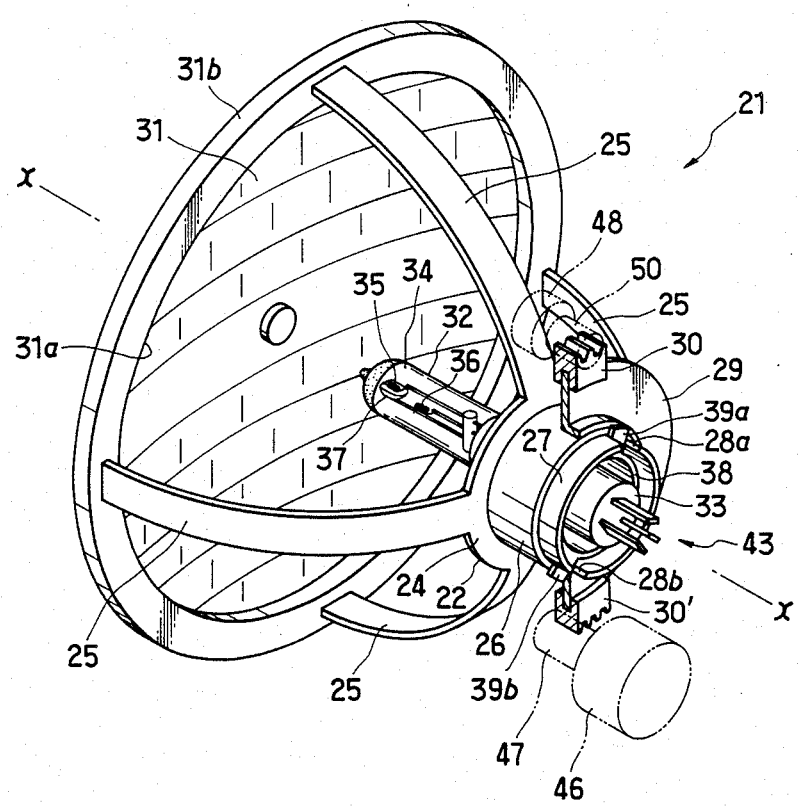
Figure 5:
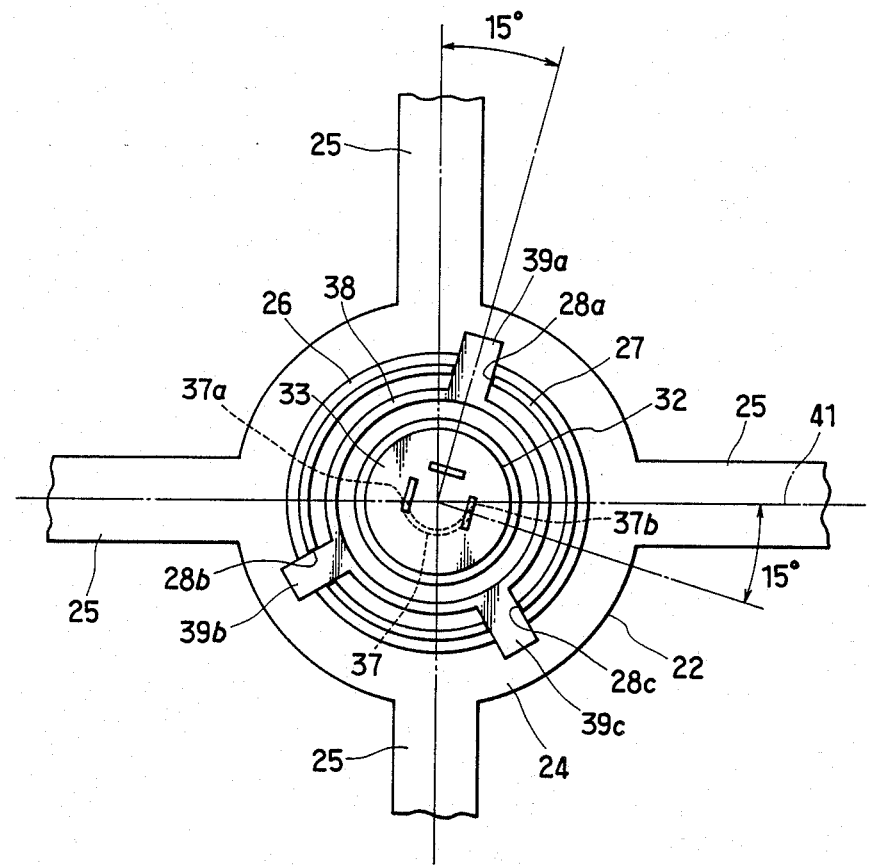

Shown at 21 is a movable portion which comprises a connecting member 22, a control lens 31 and a bulb 32.

a-3a Connecting Member [FIG. 1, FIG. 4, FIG. 5]

The connecting member 22 acts to connect the control lens 31 and the bulb 32, and comprises a circular plate portion 24 having an opening 23 in the central portion, four curved arms 25, 25 . . . integrally extending forward from the outer periphery of the circular plate portion 24 and spaced generally 90° from each other, and a tubular portion 26 integrally extending rearward from the edge of the opening 23. A bulb mounting tube 27 is fitted in and secured to the tubular portion 26 with the rear end portion thereof extending rearward of the tubular portion 26.

Three cutouts 28a, 28b and 28c are formed in the rear end portion of the bulb mounting tube 27 as shown in FIG. 5 and the width of the uppermost cutout 28a is larger than that of remaining two cutouts 28b and 28c.

A generally circular gear plate 29 is fitted on and secured to the rear end of the tubular portion 26, and has on the upper and lower portions of the outer periphery arcuate gears 30 and 30' each having gear teeth in the outer circumference thereof.

a-3b Control Lens [FIG. 1, FIG. 4]

The control lens 31 controls the light distribution emitted from the lamp body 2, and has a thick thickness portion 31a on the outer circumference, a radial flange 31b on the outer circumference of the portion 31a and a relatively small recess 31c in the central portion of the front surface.

The outer peripheral portion 31a of the control lens 31 is secured to the tip ends of the arms 25, 25 . . . of the connecting member 22 whereby the control lens 31 is integrally connected to the connecting member 22.

a-3c Bulb [FIG. 1, FIG. 2, FIG. 4~FIG. 6]

The Bulb 32 is preferably "Halogen H, Headlamp Bulb" of EC standard, which comprises a base 33, a glass bulb 34 projecting forward from the base 33, a sub-filament 35 acting as a light source of low beam, a main filament 36 acting as a light source of main beam and a douser cap 37 of generally dish shaped configuration covering for covering generally the lower half and the forward of the sub-filament 35.

A generally tubular flange portion 38 is secured to the base 33 with the diameter of which being slightly smaller than the inner diameter of the bulb mounting tube 27 of the connecting member 22 and, has on the rear end thereof three radially outward extending locating pieces 39a, 39b and 39c. The forward end of the flange portion 38 is secured to the forward portion of the base 33 by such as welding.

The positional relationship and the width of the locating pieces 39a, 39b and 39c correspond respectively with that of the cutouts 28a, 28b and 28c of the bulb mounting tube 27 of the connecting member 22.

Figure 6A:
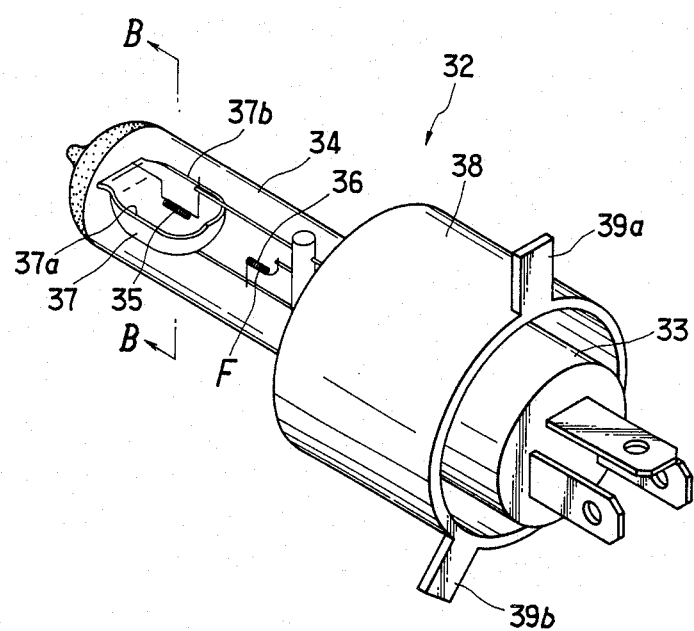
FIG. 6A is an enlarged perspective view of a bulb.
Figure 6B:
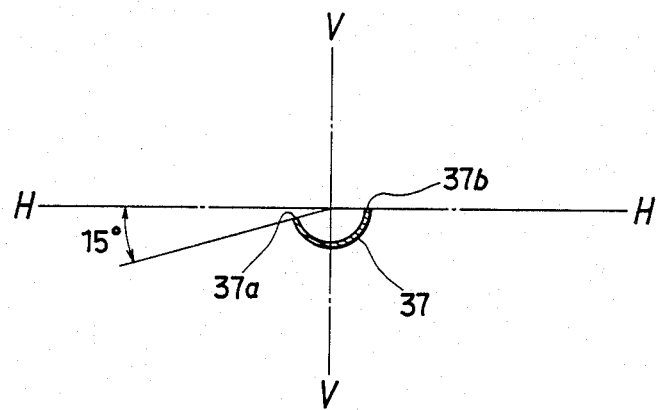
FIG. 6B is a sectional view taken along line B—B

The locating pieces 39a, 39b and 39c are located such that when the piece 39a of the wide width is located vertically upward of the optical axis of the bulb 32 as shown in FIG. 6A, the left shoulder line 37a of the douser cap 37 is located lower than the horizontal line including the optical axis by 15° as shown in FIG. 6B.

The bulb 32 is mounted on the mounting tube 27 with the locating pieces 39a, 39b and 39c of the flange portion 38 engaging respectively corresponding cutouts 28a, 28b and 28c of the bulb mounting tube 27 of the connecting member 22, whereby angular position of the bulb 32 around the optical axis relative to the connecting member 22 and the lens 31 is determined, and a bulb retainer 40 [FIG. 1] is provided on the mounting tube 27 to retain the bulb 32 on the mounting tube 27.

The control lens 31 and the bulb 32 are connected integrally through the connecting member 22 and are located co-axially with respect to the optical axis x—x.

a-3d Support by Lamp Body [FIG. 1]

The movable portion 21 is rotatably mounted around the optical axis x—x of the control lens 31 and the bulb 32 within the space defined between the reflective mirror 10 and the cover lens 20. Namely, the flange 31b of the control lens 31 is slidably fitted in an annular groove defined by the lens supporting portion 12 of the rear side and the rear surface of the outer circumferential portion of the cover lens 20, and the recess 31c in the front central portion of the lens 31 is rotatably engaging the projection 20a formed on the rear central portion of the cover lens 20, so that movable portion 21 is rotatably supported in the mirror 10 and the cover lens 20. The tubular portion 26 of the connecting member 22 is rotatably inserted through the annular projection 14 of the reflective mirror 10.

The cover lens 20 is mounted after the movable portion 21 is located in the mirror 10, and is fitted in the lens supporting portion 11 of the front side, then, the mounting ring 15 is connected to the retaining ring 17. The gear plate 29 is connected to the tubular portion 26 of the connecting member 22 after the member 22 is connected to the mirror 10 and the portion 26 projects rearward of the projection 14 of the mirror 10.

Figure 7:
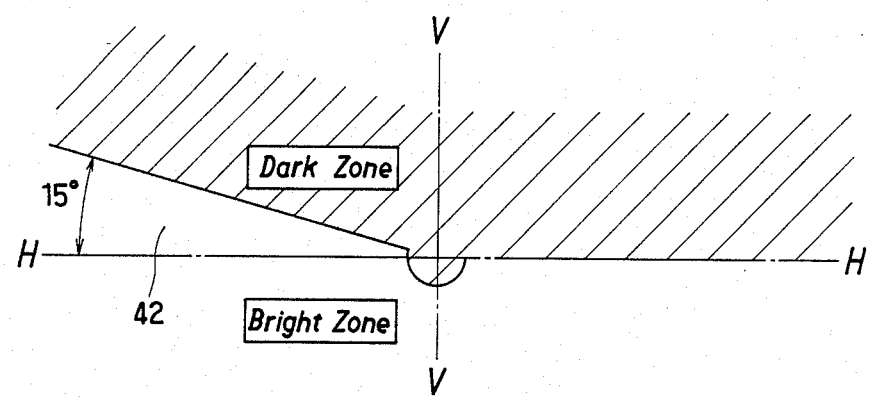
Figure 8:
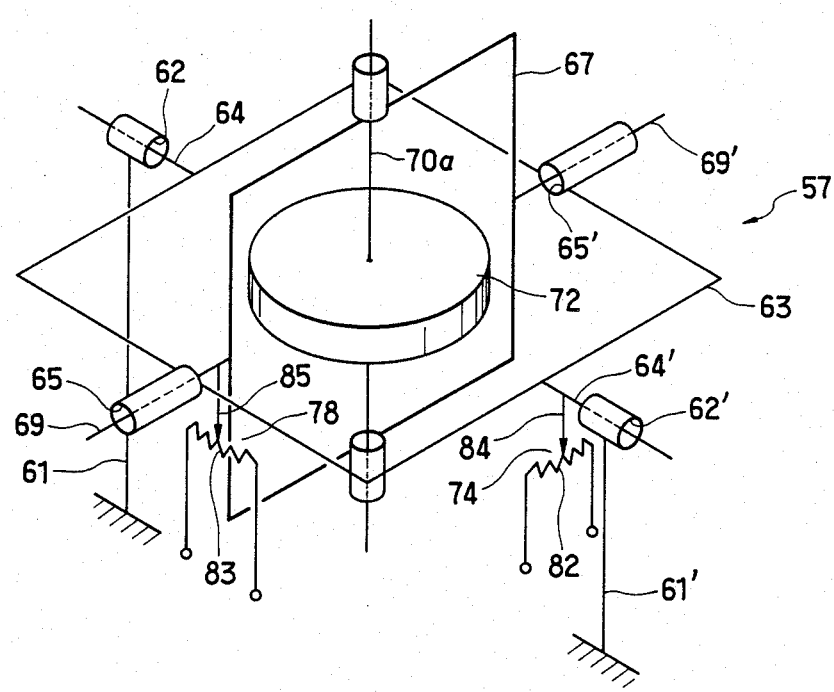

Thus, the bulb 32 and the control lens 31 are mounted in the lamp body 2 rotatably around the optical axis x-x and, the main filament 36 of the bulb 32 takes the position of the focus F of the mirror 10 and, the subfilament 35 of the bulb 32 takes the position slightly forward of the focus F of the mirror 10.

a-3e Light Distribution [FIG. 5, FIG. 7]

The douser cap 37 of the bulb 32 normally takes the position as shown in FIG. 5, namely, the left shoulder line 37a lies on the horizontal plane 41 including the axis of the mirror 10, and the right shoulder line 37b takes the position lower side of the horizontal plane 41 by 15°.

Thus, the light distribution of the sub-filament 35 at the positional relationship of above described bulb 32 and the mirror 10 has, as shown in FIG. 7, an upward bright zone 42 on the left side of the vertical line V—V including the optical axis of the bulb 36 and upper side of the horizontal line H—H and having the central angle of 15°. Namely, since the sub-filament 35 is located on the optical axis of the mirror 10 and slightly forward of the focus F, the light beam passing adjacent to the right shoulder line 37b of the douser cap 37 which is located lower side of the horizontal line by the central angle of 15° is reflected upward and is transversely inverted, whereby the bright zone 42 is formed.

a-4 Driving means of Movable Portion [FIG. 1, FIG. 4]

The movable portion 21 is rotated by driving means 43.

A supporting plate 44 is mounted to cover the rear side of the mirror 10, and has a central opening 45 through which the rear end of the base 33 of the bulb 32 extends rearward.

The lower end portion of the supporting plate 44 is formed to project slightly rearward to mount a first motor 46 with the rotatable shaft 46a thereof extending generally parallel to the optical axis. A gear wheel 47 mounted on the shaft 46a engages with the lower side arcuate gear 30' of the connecting member 22.

A first inclination detector 48 is mounted on the inner surface of the upper end portion of the supporting plate 44, and a rotor shaft 49 of the detector 48 has a gear 50 fixed thereon to engage with the upper side arcuate gear 30 of the connecting member 22. The detector 48 comprises a potentiometer the resistance of which changes according to the rotation of the shaft 49.

When the first motor 46 rotates, the lower arcuate gear 30' rotates due to the gear 47 of the first motor 46, thus, the gear plate 29 rotates and, the connecting member 22, integrally with the bulb 32 and the control lens 31, rotates around the optical axis whereby the angle of the beam of the headlight 1 changes in the transverse directions.

The rotation of the gear plate 29 causes the rotation of the gear 50 of the first inclination detector 48 through the upper side arcuate gear 30, thus, the terminal voltage of the detector 48 changes, and the angle of inclination of the bulb 32 and the control lens 31 in the transverse directions can be detected from the terminal voltage.

a-5 Driving Means of Lamp Body [FIG. 2, FIG. 3]

The mirror 10, the cover lens 320 and the movable portion 21 are inclined in the vertical directions by rotating the lamp body 2 in the vertical directions through driving means 51.

The driving means 51 comprises a second motor 52 being mounted on the left surface of the right side supporting arm 8'. And the rotatable shaft 52a of the motor 52 extends in the vertical directions and has a worm 53 to engage with the worm wheel 7' which is formed on the right side arm 6' of the lamp body 2.

A second inclination detector 54 is mounted on the right surface of the left side supporting arm 8, and a worm gear 56 fixed on the tip end of the rotatable shaft 55 engages with the worm wheel 7 which is formed on the left side arm 6 of the lamp body 2. The detector 54 comprises a potentiometer the resistance of which changes in accordance with the rotation of the shaft 55.

Upon the rotation of the second motor 52, the tip end of the right side arm 6' of the lamp body 2 moves in the vertical directions, and the lamp body 2 together with integrally the control lens 31, the bulb 32, the connecting member 22, the mirror 10 and the like inclines in the vertical directions around the axis defined by the pins 9 and 9'. The optical axis x—x of the control lens 31, the bulb 32 and the mirror 10 also inclines in the vertical directions, thus, the light beam moves in the vertical directions.

The inclining movement of the lamp body 2 in the vertical directions causes the rotation of the rotor shaft 55 of the second inclination angle detector 54 through the worm gear 7 on the left side arm 6 and the gear 56, thus, the terminal voltage of the detector 54 changes, and the angle of inclination of the headlight 1 in vertical directions relative to the vehicle body can be detected by detecting the terminal voltage.

b. Inclination Detector of Vehicle [FIG. 8~FIG. 11]

Figure 9:
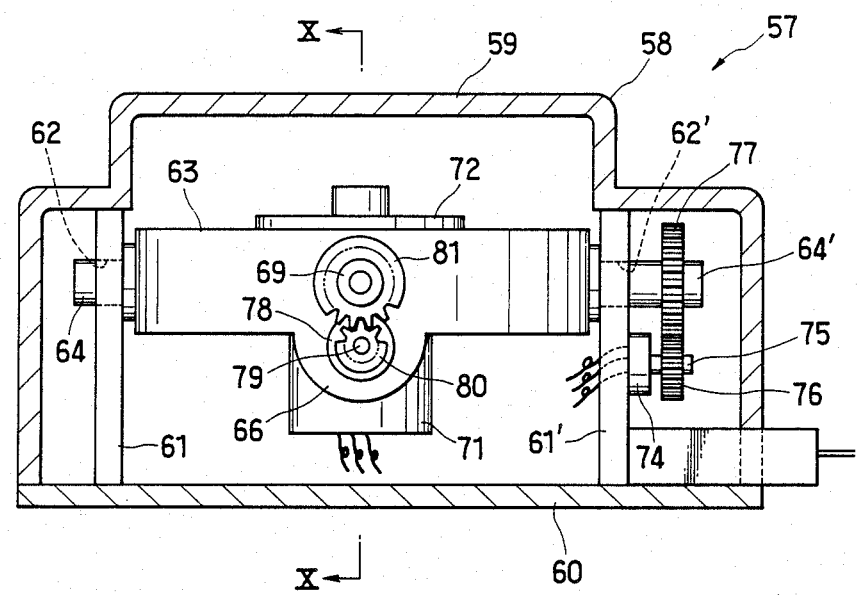
Figure 10:
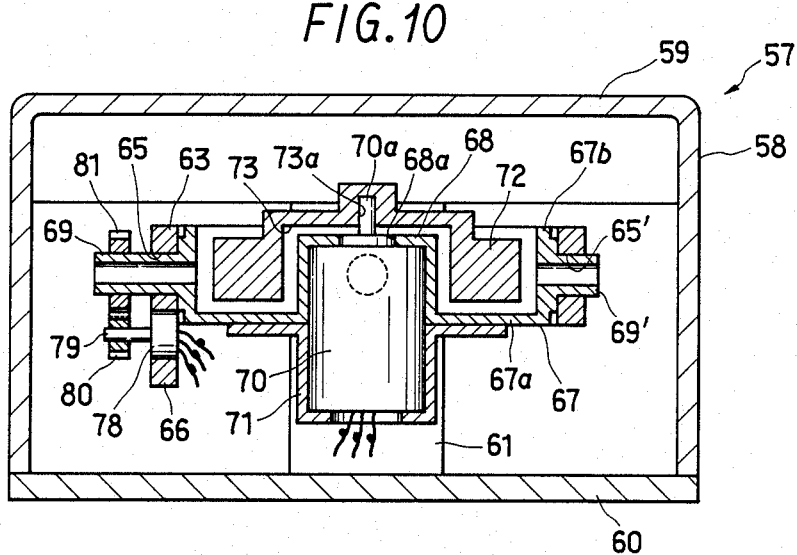
Figure 11:
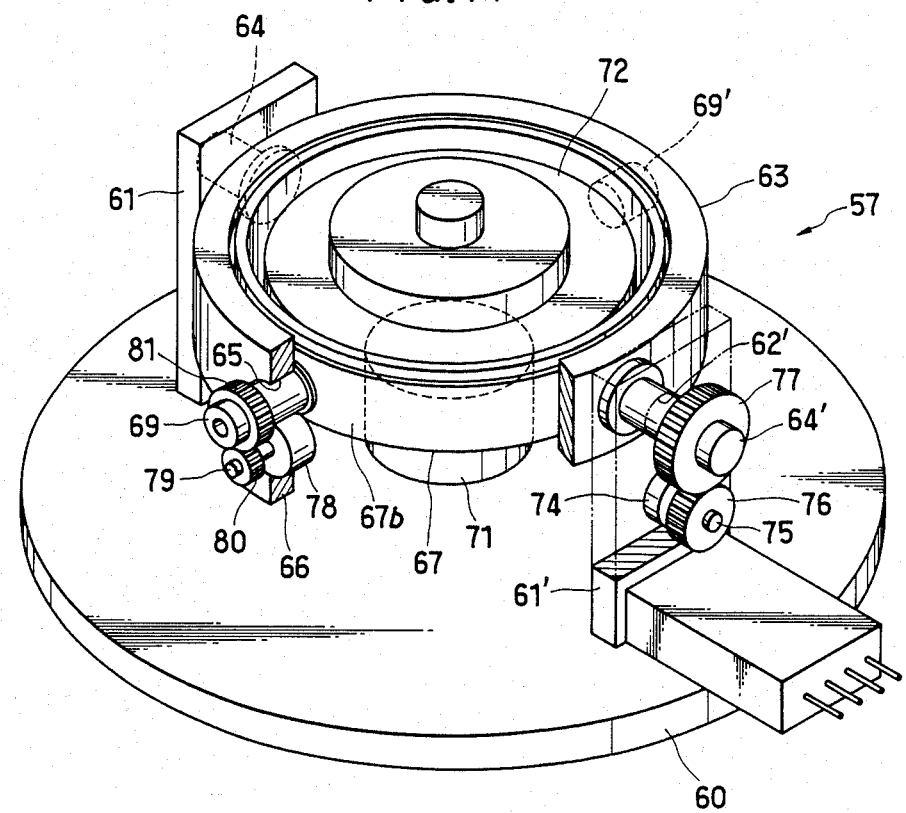
Figure 12:
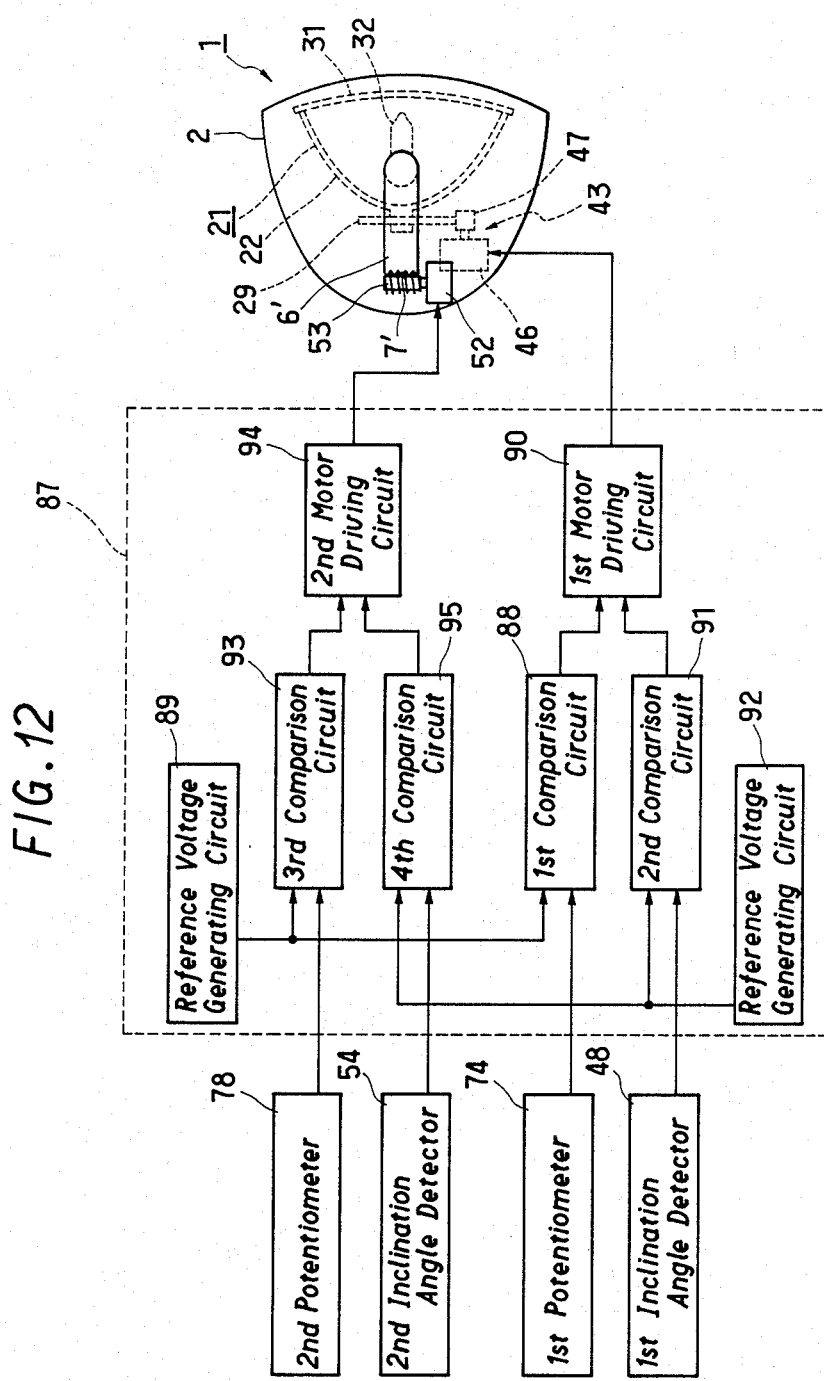
FIG. 12 is a block diagram of a control circuit.
Figure 13:
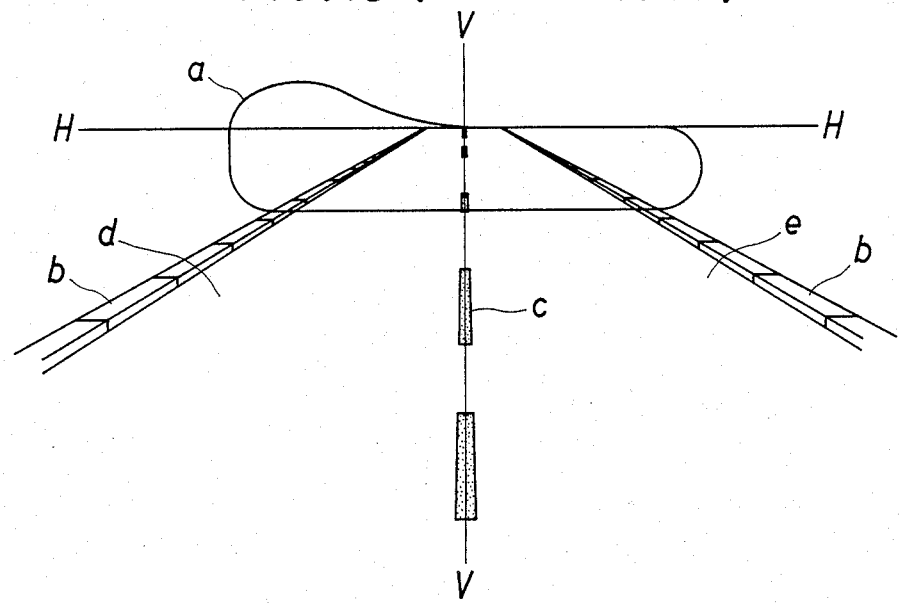
FIG. 13 is a view showing a typical light distribution of a headlight of a vehicle.
Figure 14:
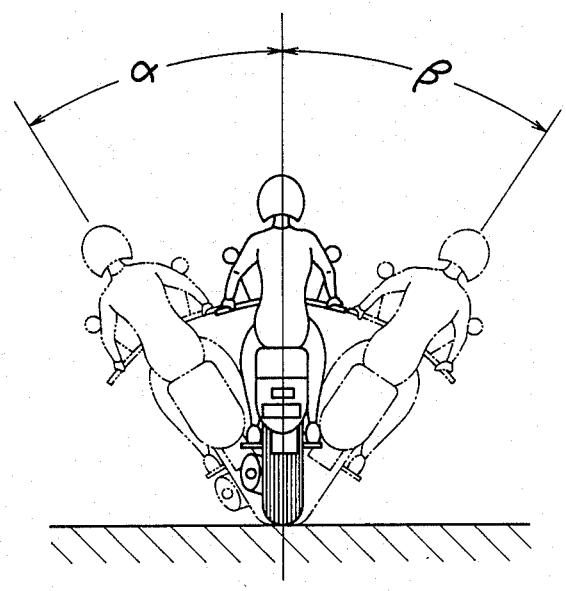
FIG. 14 is a view showing the inclination of a body of a two wheeled vehicle in the transverse direction.

The inclination angle of the vehicle is detected by vehicle body inclination detecting means 57 shown in FIG. 8~FIG. 11.

b-1 Casing [FIG. 9~FIG. 11]

A casing 58 is mounted on generally central portion of the body of the vehicle, and comprises a cover member 59 and a base plate 60 on which the cover member 59 is mounted. In FIG. 11, the forward direction of the vehicle is denoted by the inclined left and upward direction and the inclined right and downward direction depicts the rear side of the vehicle. There are provided on the base plate 60 supporting walls 61 and 61' spaced parallel in the forward and rearward directions of the vehicle and having respectively aligned supporting bores 62 and 62' extending in the forward and rearward directions or the longitudinal directions.

b-2 Gimbals [FIG. 8~FIG. 11]

An outside gimbal 63 is a generally annular member and has shafts 64 and 64' which project longitudinally and horizontally and are rotatably received in the bores 62 and 62' respectively. The gimbal 63 further has bores 65 and 65' defining an axis perpendicular to the forward and rearward directions or the transverse directions. A projecting portion 66 is formed integrally to project downward of the left side supporting bore 65.

An inside gimbal 67 is rotatably supported by bores 65 and 65' of the outside gimbal 63, and has a generally circular base plate 67a with the diameter of which being slightly smaller than the inner diameter of the outside gimbal 63, a peripheral wall 67b integrally formed on the base plate 67a, and a generally tubular projection 68 integrally formed on the central portion of the base plate 67a and having an open lower end and a closed upper end. Further, shafts 69 and 69' project in the transverse directions and are rotatably received in the bores 65 and 65' respectively.

b-3 Motor, Rotating Member [FIG. 8~FIG. 11]

A motor 70 is mounted on the inside gimbal 67 with the upper portion thereof being received in the projection 68 of the gimbal 67 and the lower half portion being located by a motor mounting member 71 which is secured to the lower surface of the base plate 67a of the inside gimbal 63. A rotating shaft 70a of the motor 70 extends upward through an opening 68a formed in the projection 68, and is connected to a rotor 72.

The rotor 72 is a circular member with the diameter being slightly smaller than the inner diameter of the outer peripheral wall 67b of the inner gimbal 67 and has a relatively large recess 73 in the central portion of the lower surface thereof. An opening 73a is formed in the central portion of the upper surface of the recess 73 to which the upper end portion of the rotating shaft 70a is forcively fitted. The projection 68 of the inner gimbal 67 is loosely received in the recess 73. Thus, the rotor 72 is rotated by the motor 70 around the axis of the shaft 70a of the motor 70.

The inner gimbal 67 can freely be inclined both in the transverse and longitudinal directions with respect to the casing 58 or to the vehicle body, and the motor 70 is mounted on the inner gimbal 67, thus, the centrifugal force caused of the rotation of the rotor 72 acts to maintain the shaft 70a of the motor 70 in the direction parallel to the direction of the gravity or in the vertical directions. Accordingly, even though the body of the vehicle is inclined, the rotor 72 and the inner gimbal 67 are maintained on the horizontal attitude.

b-4 Potentiometer [FIG. 8~FIG. 12]

A first potentiometer 74 is secured to the rear side supporting wall 61, and a gear 76 is secured to the tip end of a rotor shaft 75 of the potentiometer 74 to engage with a gear 77 which is secured to a portion of the shaft 64' of the outer gimbal 63 projecting through the supporting bore 62' in the supporting wall 61'.

A second potentiometer 78 is mounted on the projecting portion 66 of the outer gimbal 63, and a gear 80 is secured to the tip end portion of a rotor shaft 79 of the potentiometer 78 to engage with a gear 81 which is secured to a portion the shaft 69' of the inner gimbal 67 projecting through the supporting bore 65' in the supporting wall 64'.

These potentiometers 74 and 78 have in respective casings resistances 82 and 83 (FIG. 8) with contact points 84 and 85 provided on rotor shafts 75 and 79 slidably engaging with the resistances 82 and 83.

b-5 Operation

The inclination of the vehicle body is detected by the inclination detecting means 57 as follows.

When the rotor 72 is rotating or the inner gimbal 67 is maintained on the horizontal attitude and, when the vehicle body inclines in the longitudinal directions or the vehicle takes the forward up or the forward down attitude, the outer gimbal 63 inclines in longitudinal directions, thus, the gear 81 fixed to the shaft 69 of the inner gimbal 67 rotates relative to the outer gimbal 63, thereby the gear 81 rotates the gear 80 fixed to the rotor shaft 79 of the second potentiometer 78. the contact position of the contact point 85 secured to the rotor shaft 79 relative to the resistance 83 changes, the resistance value of the resistance 83 changes and the terminal voltage of the second potentiometer 78 also changes. Accordingly, the angle and the direction of the inclination of the body of the vehicle in longitudinal directions can be detected from the terminal voltage.

When the vehicle inclines in transverse directions, the outer gimbal 63 is also maintained on the horizontal attitude, and the gear 77 fixed to the shaft 64' of the outer gimbal 63 rotates relative to the casing 58, thus, the gear 77 rotates the gear 76 fixed to the rotor shaft 75 of the first potentiometer 74. The contact position of the contact point 84 secured to the rotor shaft 75 relative to the resistance 82 changes, the resistance value of the resistance 82 changes and the terminal voltage of the first potentiometer 74 also changes. Accordingly, the angle and the direction of the inclination of the body of the vehicle in transverse directions can be detected from the terminal voltage.

When the vehicle inclines both in longitudinal and transverse directions, the angle and the direction can be detected by the first and the second potentiometers 74 and 78 simultaneously.

c. Control Circuit [FIG. 12]

Now, description will be made with respect to control circuit 87.

A first comparison circuit 88 compares the terminal voltage of the first potentiometer 74 or the signal indicating the inclination of the vehicle body in the transverse directions with a reference voltage received from a reference voltage generating circuit 89 or a voltage equal to the terminal voltage of the first potentiometer 74 when the vehicle body is not inclined in the transverse directions and, generates a driving signal corresponding the difference therebetween to a first motor driving circuit 90 for driving the first motor 46. The first motor 46 is driven in the normal or reverse directions whereby the movable portion 21 is inclined leftward or rightward.

A second comparison circuit 91 compares the terminal voltage of the first inclination angle detector 48 or the signal indicating the inclination of the movable portion 21 relative to the vehicle body in transverse directions with a reference voltage received from a reference voltage generating circuit 92 or a voltage which should be supplied from the first inclination angle detector 48 and corresponding to a predetermined correction angle and, supplies to the first motor driving circuit 90 a stop signal for stopping the rotation of the first motor 46 when the two signals are equal to each other.

Thus, when the vehicle body inclines in the transverse directions, the movable portion 21 is inclined by the first motor 46 to a desired direction and amount.

A third comparison circuit 93 compares the terminal voltage of the second potentiometer 78 or the signal indicating the inclination of the vehicle body in the longitudinal directions with a reference voltage received from a reference voltage generating circuit 89 or a voltage equal to the terminal voltage of the second potentiometer 78 when the vehicle body is not inclined in the longitudinal directions and, generates a driving signal corresponding the difference therebetween to a second motor driving circuit 94 for driving the second motor 52. The second motor 52 is driven in the normal or reverse directions whereby the lamp body 2, the mirror 10, the movable portion 21 and the like are inclined either of the upward and downward directions.

A fourth comparison circuit 95 compares the terminal voltage of the second inclination angle detector 54 or a signal indicating the inclination of the lamp body 2 relative to the vehicle body in longitudinal directions with a reference voltage received from the reference voltage generating circuit 92 or a voltage corresponding to a desired correction angle and, supplies a signal to the second motor driving circuit 94 for stopping the rotation of the second motor 52 when the two signals are equal to each other.

Thus, when the vehicle body inclines in longitudinal directions, the lamp body 2 is inclined by the second motor 52 to a desired direction and amount.

d. Light Distribution Adjusting Operation

The light distribution of the headlight is adjusted by the control circuit 87 as follows.

When the vehicle body is not inclined in either of the longitudinal and transverse directions, the terminal voltages of the potentiometers 74 and 78 of the vehicle body inclination detector 57 are equal to the reference voltage of the reference voltage generating circuit 89, thus, the first motor 46 and the second 52 do not rotate.

When the vehicle body inclines in the longitudinal directions, the light beam of the headlight may incline upward or downward. According to the embodiment, the outer gimbal 63 of the vehicle body inclination detector 57 inclines in the longitudinal directions and the terminal voltage of the second potentiometer 78 changes from the reference voltage, thus, a signal is supplied from the third comparison circuit 93 to the second motor driving circuit 94 for rotating the second motor 52. The lamp body 2 is inclined in the longitudinal directions. The rotation of the motor 52 terminates when the lamp body 2 is inclined by a desired correction angle.

Figure 15:
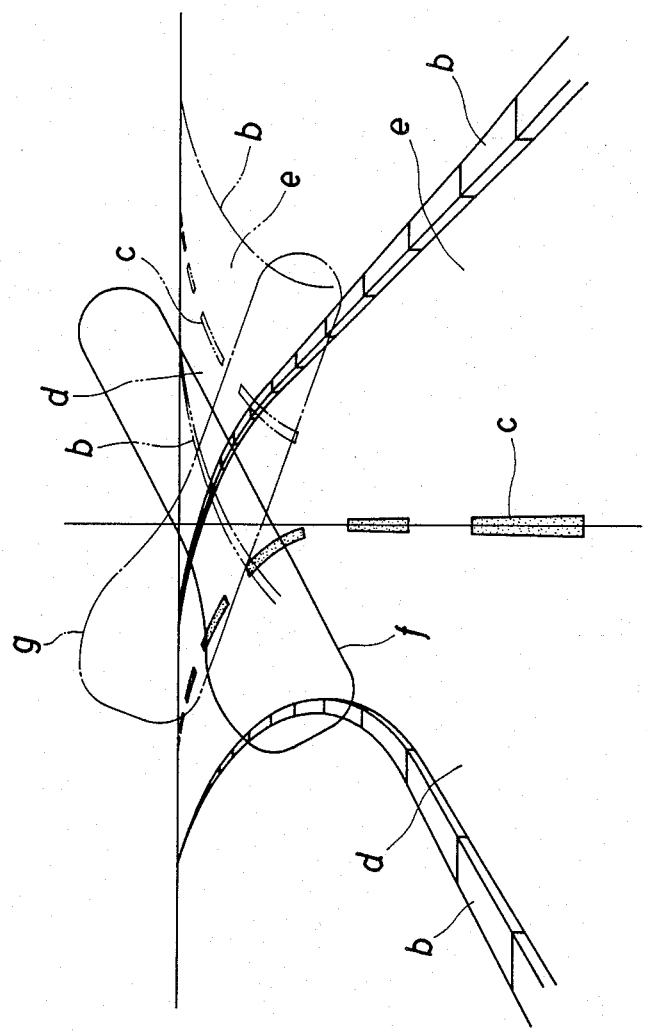
FIG. 15 is a view showing the light distribution when the vehicle body is inclined.

When the vehicle body inclines in the transversal directions, the bulb 32 and the control lens 31 may incline in the same direction and the distribution of the light beam of the headlight may incline leftward or rightward as shown in FIG. 15. According to the embodiment, the outer gimbal 63 of the vehicle body inclination detector 57 inclines in the transverse directions and the terminal voltage of the first potentiometer 74 changes from the reference voltage, thus, a signal is supplied from the first comparison circuit 88 to the first motor driving circuit 90 for rotating the first motor 46. The bulb 32 and the control lens 31 are inclined in the transverse directions around the optical axis by the rotation of the connecting member 22. The rotation of the motor 46 terminates when the bulb 32 and the control lens 31 are inclined by a desired correction angle.

When the vehicle body is inclined simultaneously both in the longitudinal and transverse directions, the first and second motors 46 and 52 rotate simultaneously and the distribution of the light beam of the headlight is adjusted with respect to both directions.

ADVANTAGES OF THE INVENTION

As described heretofore, the headlight according to the invention is of the kind wherein the inclination of the light distribution in the transverse directions is defined by the rotation of a light source and a lens around the optical axis and, is characterized in that the light source and the lens are integrally formed and rotatably supported in a lamp body around the optical, and that driving means are provided in the lamp body for rotating the integrally formed light source and lens.

According to the invention, only the light source and the lens are moved in adjusting the light distribution in the transverse directions, thus, it is possible to reduce the size and the weight of the movable members and to simplify the construction for supporting them, whereby a small sized and light weight headlight can be realized. Further, the movement of the movable members is smooth and the adjusting movement is quick and reliable.

It will be understood that the embodiment enables to adjust also the light distribution in the longitudinal directions, however, such feature is not essential to the present invention, and that the detailed construction shown in the embodiment is a mere example.

What is claimed is:

1. A headlight for use in a vehicle comprising: a lamp body; a reflector fixedly mounted in said lamp body; a light source and a lens; a connecting member for integrally connecting said light source and said lens; means for rotatably mounting said light source, lens and connecting member within said lamp body around the optical axis thereof; and driving means for rotating the integrally connected light source, lens and connecting member relative to said lamp body and said reflector for defining the inclination of the distribution of a light beam produced by said headlight.

2. A headlight according to claim 1, further comprising means for detecting the inclination of the vehicle body, means for detecting the rotation of said integrally connected light source, lens and connecting member, and means for controlling the rotation of said light source, lens, and connecting member in response to the inclination of the vehicle body.

3. A headlight according to claim 1 further comprising means for mounting the lamp body on the vehicle rotatably so as to incline the lamp body in the longitudinal directions of the vehicle, driving means for rotating the lamp body, means for detecting the inclination of the vehicle body in the longitudinal directions of the vehicle, means for detecting the rotation of the lamp body, and means for controlling the rotation of the lamp body in the longitudinal directions of the vehicle in response to the inclination of the vehicle body in the longitudinal directions.

4. A headlight according to claim 2, wherein said means for detecting the inclination of the vehicle body comprises a rotor driven by an electric motor and supported on a gimbal device for maintaining the rotor at a predetermined attitude irrespective to the inclination of the vehicle body and a potentiometer generating an electric signal corresponding to the relative inclination between the rotor and the vehicle body, and means for controlling the rotation of the lamp body and the lens comprises an electric circuit for actuating and deactuating the operation of said driving means in response to said electric signal.

5. A headlight according to claim 2, further comprising means for mounting the lamp body on the vehicle rotatably so as to incline the lamp body in the longitudinal directions of the vehicle, driving means for rotating the lamp body, means for detecting the inclination of the vehicle body in the longitudinal directions of the vehicle, means for detecting the rotation of the lamp body, and means for controlling the rotation of the lamp body in the longitudinal directions of the vehicle in response to the inclination of the vehicle body in the longitudinal directions.

6. A headlight according to claim 1, wherein said connecting member comprises a circular plate portion having an opening in a central portion thereof, means for mounting said light source in said opening, a plurality of curved arms connected at one end to said circular plate portion, and a radial flange portion connected to other ends of said arms, said lens being carried by said radial flange portion.

7. A headlight according to claim 6, wherein said means for mounting said light source in said opening comprises a tubular portion fixed to said circular plate portion around said opening and a bulb mounting tube fitted in and secured to said tubular portion.

8. A headlight according to claim 7, wherein said driving means comprises a gear plate fixed to said tubular portion.

9. A headlight according to claim 6, wherein said arms are positioned inside said reflector and are curved to conform with a shape of said reflector.

* * * * *